United States Patent [19]

Eaton et al.

[11] Patent Number: 4,662,388
[45] Date of Patent: May 5, 1987

[54] BALL ASSEMBLY FOR CROSSING HOT AND COLD WATER CHANNELS IN A FAUCET MIXING VALVE HOUSING

[75] Inventors: Rodger D. Eaton, Wichita; Mark L. Spexarth, Colwich, both of Kans.

[73] Assignee: Eaton Plumbing Co., Inc., Wichita, Kans.

[21] Appl. No.: 791,579

[22] Filed: Oct. 25, 1985

[51] Int. Cl.[4] .................................. F16L 11/087
[52] U.S. Cl. .......................... 137/270; 137/625.41
[58] Field of Search ................ 137/269, 625.4, 625.41, 137/270, 271

[56] References Cited

U.S. PATENT DOCUMENTS 4,352,369  11/1982  Lorch .................... 137/625.4 X Primary Examiner—Martin P. Schwadron
Assistant Examiner—Stephen M. Hepperle
Attorney, Agent, or Firm—Schmidt, Johnson, Hovey & Williams

[57] ABSTRACT

A ball assembly for crossing hot and cold water channels in a faucet mixing valve housing. The ball assembly is used with a hot and cold water faucet and is interchangeable with other ball assemblies when water lines have been inadvertently or intentionally crossed.

10 Claims, 6 Drawing Figures

BALL ASSEMBLY FOR CROSSING HOT AND COLD WATER CHANNELS IN A FAUCET MIXING VALVE HOUSING

BACKGROUND OF THE INVENTION

This invention relates to an apparatus for crossing hot and cold water lines and more particularly, but not by way of limitation, to a ball assembly used with a faucet mixing valve housing for crossing hot and cold water channels in the valve housing when water lines have inadvertently or intentionally crossed.

In the following U.S. Patents, U.S. Pat. No. 3,329,162 to Sanford, U.S. Pat. No. 3,823,737 to Szymanski and U.S. Pat. No. 4,393,330 to Hayman various types of mixing valves and adapters for plumbing fittings are disclosed. None of these prior art devices provide the unique features and advantages of the subject ball assembly used with a hot and cold water faucet. Further, the subject ball assembly provides another means for crossing hot and cold water lines when compared to the subject inventor's liquid flow converter used for mating with a standard single-handled mixing valve and properly directing the receipt of crossed hot and cold water lines. The liquid flow converter is described in U.S. patent application Ser. No. 726,569 filed Apr. 24, 1985.

SUMMARY OF THE INVENTION

The subject invention is readily adaptable and interchangeable with other ball assemblies in a faucet mixing valve for redirecting crossed water lines.

The ball assembly can be used in commercial plumbing installations, hotels, motels, apartments, residential installations and other types of building structures where hot and cold water supply lines have been reversed inadvertently. Also, the assembly can be used in back-to-back installations where plumbing lines are installed in common walls and for labor and material cost, the hot and cold water lines are intentionally reversed.

The ball assembly is simple in design, one-piece in construction and can be easily installed with standard plumbing equipment. The assembly prevents the time and expense of tearing up inproperly installed water supply lines. Also, the ball assembly can be used with faucets having a handle lever that slides the ball to the left or right for hot and cold water or with a faucet that has a handle which rotates the ball counterclockwise or clockwise for hot and cold water.

The ball assembly for crossing hot and cold water channels of a faucet mixing valve housing includes a mixing ball with handle stem extending outwardly therefrom for attaching a faucet handle thereto. The ball has a hot water port and a cold water port communicating with an exit port therein. The exit port communicates with a return channel in the valve housing. The ball has a centerline therethrough and along the length of the stem. When the ball centerline is aligned with the housing centerline, the ball is in a mixed position with the hot water port to the left of the centerline and communicating with a cold water channel in the housing. The cold water port is to the right of the centerline and communicates with the hot water channel. When the handle stem is moved to the left, the hot water port slides to the right, crossing the housing centerline and communicates with the hot water channel. When the handle stem is moved to the right, the cold water port slides to the left, crossing the housing center line and communicates with the cold water channel.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
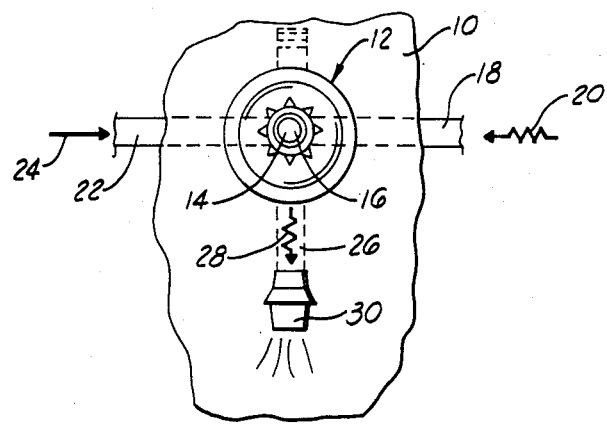
FIG. 1 is a front view illustrating a standard single-handled mixing valve with faucet in a bathtub installation.

In FIG. 1 a typical plumbing installation in a bathtub 10 is illustrated showing a single-handle mixing valve illustrated by general reference numeral 12 and having a handle 14 with valve stem 16. The mixing valve 12 is supplied with hot and cold water by a hot water line 18 with the hot water illustrated by a jagged arrow 20 and a cold water line 22 illustrated by a straight arrow 24. In this installation, the hot water lines 18 and cold water line 22 have either inadvertently or on purpose been reversed. When the hot and cold water are mixed in the mixing valve 12, the mixed water is returned through a mix supply line 26, with the water mix illustrated by arrow 28, where it is discharged out faucet 30.

Figure 2:
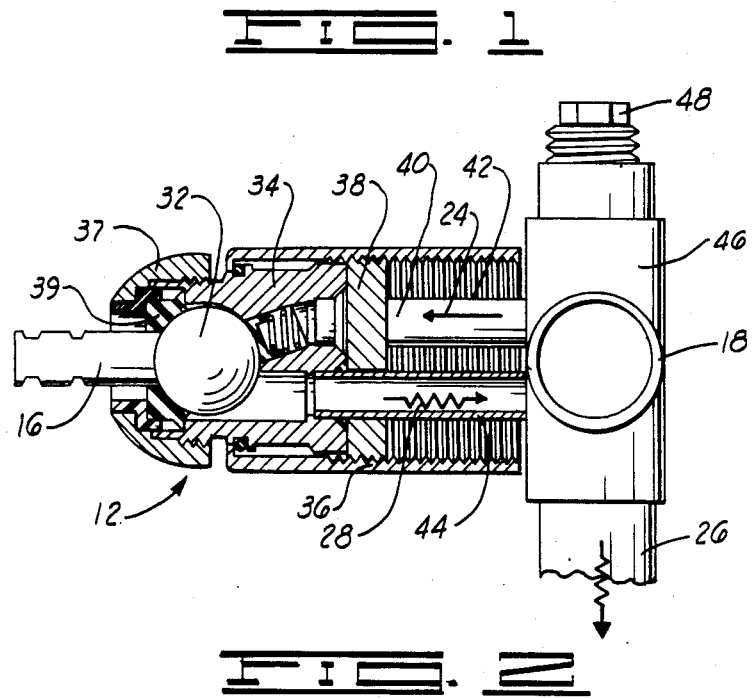
FIG. 2 illustrates a side-sectional view of the single-handled mixing valve in a prior art installation.

In FIG. 2 a standard prior art plumbing installation is illustrated showing the single-handle mixing valve 12 with the handle stem 16 connected to a mixing ball 32 received inside a mixing valve housing 34. Surrounding the housing 34 is a threaded collar 36 which secures the housing 34 adjacent a standard mounting plate 38. The mounting plate 38 is circular having threads therearound for engaging the threaded collar 36. The ball valve 32 is held in place in the housing 34 by a threaded valve cap 37 and valve seat 39.

The mounting plate 38 is used for attachment to a cold water supply line 40 and a hot water supply line 42 hidden behind the line 40. Also attached to the mounting plate 38 is a return mix line 44. The three lines 40, 42 and 44 are attached to a plumbing line "T" 46 which is used for attachment to the hot water line 18, cold water line 22 along with the mix water return line 26. Mounted on top of the "T" 46 is a "T" cap 48 which can be removed and a plumbing line installed for a shower installation. It should be kept in mind while a bathtub or shower installation are mentioned, the ball assembly as described herein can be used equally well for various types of plumbing installations where liquid lines are reversed, back to back, and improperly installed.

Figure 3:
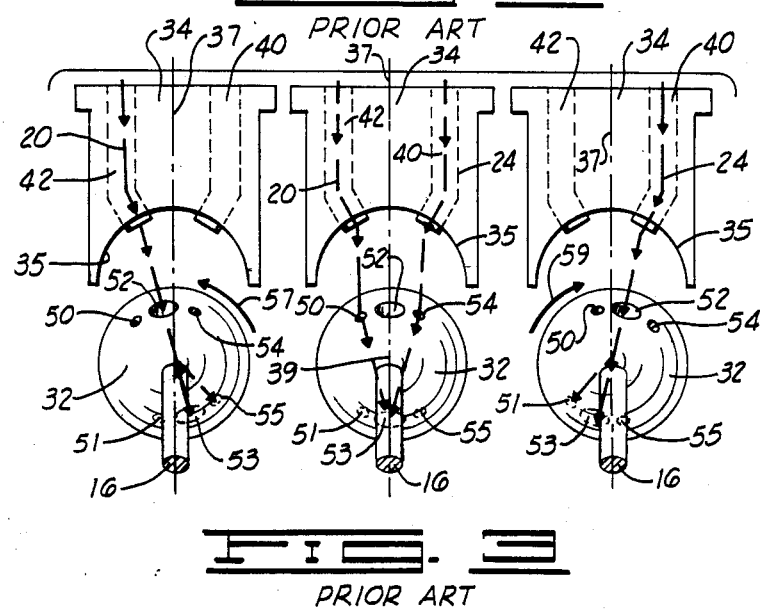
FIG. 3 illustrates the ball assembly in front of the faucet mixing valve housing with a properly installed hot and cold water lines connected to the hot and cold water channels of the housing.

In FIG. 3 the prior art mixing ball 32 is shown having a port 50, an enlarged center port 52 and a port 54 which in a neutral position receives hot and cold water as indicated by arrows 20 and 24 through the hot water channel 42 and cold water channel 40. In this view, the mixing valve housing 34 is seen with a semi-circular socket 35 for receiving the mixing ball 32 therein. The housing 34 is shown with a centerline 37 aligned with a ball centerline 39 through the length of the stem 16 and the center of the port 52. The ball 32 also has return ports 51, 53 and 55 communicating with the ports 50, 52 and 54 by either individual connecting bores or by making the ball hollow. The return ports 51, 53 and 54 are identical to the ports 50, 52 and 54 and positioned 180 degrees from these ports on the ball 32 thereby allowing the ball to be reversed during installation without changing the direction of the water flow.

When the handle stem 16 is rotated in a counterclockwise direction indicated by arrow 57, the port 52 rotates counterclockwise and is indexed and communicates with the hot water channel 42 for receiving hot water. This is a normal, correctly installed installation without the hot and cold water channels reversed. When the handle stem 16 is rotated in a clockwise direction indicated by arrow 59, the port 52 rotates in a clockwise direction and is indexed and communicates with cold water channel 40.

Figure 4:
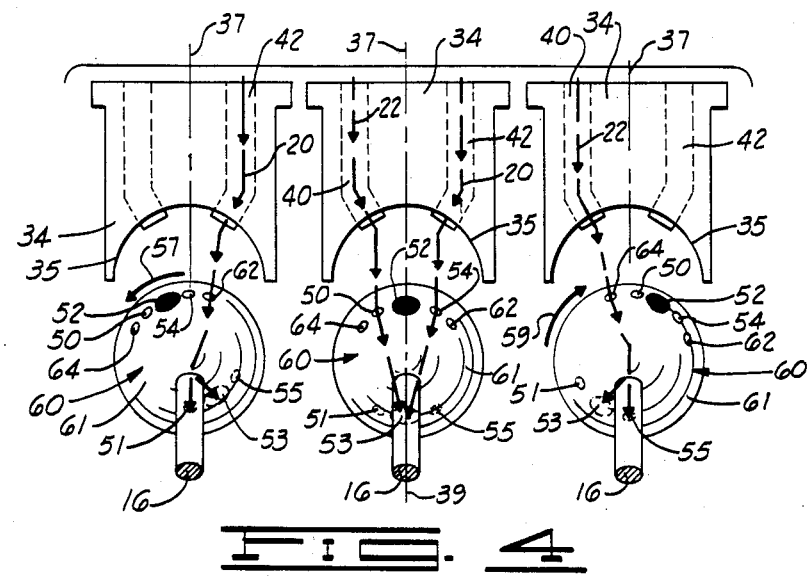
FIG. 4 illustrates the subject invention with the ball assembly constructed for crossing hot and cold water channels in the faucet mixing valve housing shown in FIG. 3.

In FIG. 4, one embodiment of the hot and cold water mixing ball assembly is shown and indicated by general reference numeral 60. The assembly 60 includes a mixing ball 61 similar to the ball 32 but with the enlarged mix port 52 plugged and an additional second hot water port 62 and a second cold water port 64. The port 50 and the port 54 are in a similar position on the ball 61 as shown in FIG. 3. It should be noted the port 50 and port 54 are equally spaced from the ball centerline 39. The second hot water port 62 and second cold water port 64 are spaced a greater distance from the centerline than the ports 50 and 54. The bores of all of the ports 64, 50, 54 and 62 communicate with the bores of the opposite ports 51, 53 and 55 by intersecting internally of the ball 61 in the well known manner, as in the prior art ball 32. Alternatively, the ball 61 may be hollow, again in the same manner as prior ball valves as described above with respect to the ball 32.

In this figure, the hot and cold water channels 40 and 42 have inadvertently or intentionally been crossed in the housing 34. In the middle view the hot and cold water mixing ball assembly 60 is in a neutral position and the centerline 39 aligned with the centerline 37 of the housing 34. Hot and cold water is properly mixed and received through port 50 and port 54 and then discharged out return ports 51, 53 and 55. When the ball assembly 60 is rotated as indicated by arrow 57 in a counterclockwise direction, the second hot water port 62 is indexed with the now hot water channel 42 for receiving hot water 20 therethrough. In this position, none of the other ports 50, 54 and 64 are indexed with the cold water channel 40. In turn, when cold water is desired, the assembly 60 is rotated in a clockwise direction indicated by arrow 59 and the second cold water port 64 is indexed and communicates with the now cold water channel 40. In the embodiment shown in FIG. 4, ports 51, 53, and 55 alternately can be called primary ports because their primary purpose is to receive inlet water in a valve installation conventionally piped with the hot water inlet on the left and the cold water inlet on the right (e.g., FIG. 3). Correspondingly, ports 50, 54, 62, and 64 alternately can be called secondary ports because their secondary purpose—to receive inlet water—comes into use when hot and cold water inlets are reversed as in FIG. 4.

For ease in manufacturing and safety, the mixing ball 61 could include knockout plugs in ports 62 and 64. This would work well on balls that are hollow, made of plastic, stainless steel and similar materials. Balls made of solid material such as brass with connecting bores to the ports could have plugs pressed therein that can be easily removed in the field. When the housing 34 is correctly installed as shown in FIG. 3 the plugs in ports 62 and 64, particularly hot water, would prevent burning or scolding the skin by unknowingly reversing the ports.

Figure 5:
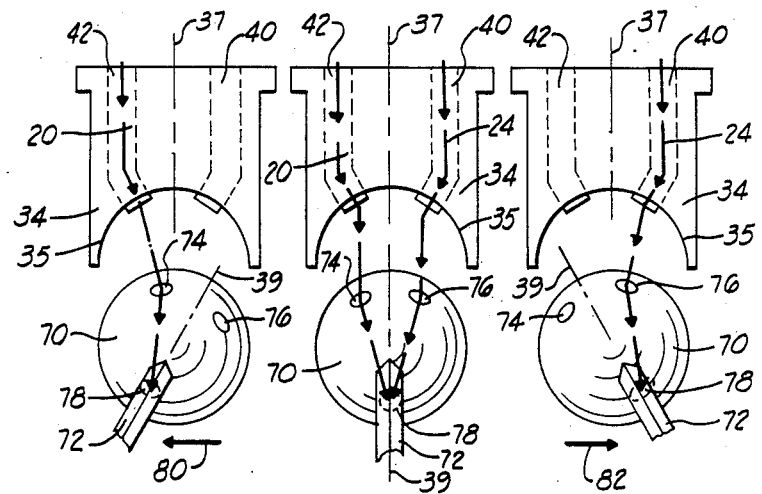
FIG. 5 illustrates a properly installed faucet housing with the hot and cold water lines connected properly to the hot and cold water channels of the housing.

In FIG. 5, a different prior art mixing ball 70 with handle stem 72 is shown having a hot water port 74 and a cold water port 76 communicating with a return port 78. The ball 70 has a centerline 39 which is aligned with centerline 37 of the housing 34. In this illustration, the hot and cold water lines are properly installed with hot and cold water received in channels 42 and 40. The ball 70 and handle stem 72 are different in operation from the mixing ball 32 shown in FIG. 3 in that the handle stem 72 when connected to a lever type handle slides the ball 70 either to the left or right in the socket 35 rather than rotate the ball 70. Therefore, when the handle stem 72 is moved to the left, indicated by arrow 80, for receiving hot water, the hot water port 74 is indexed and communicates with hot water channel 42. Likewise when the handle stem 72 is moved to the right indicated by arrow 82, the cold water port 76 is indexed and communicates with cold water channel 40 for receiving water therein.

Figure 6:
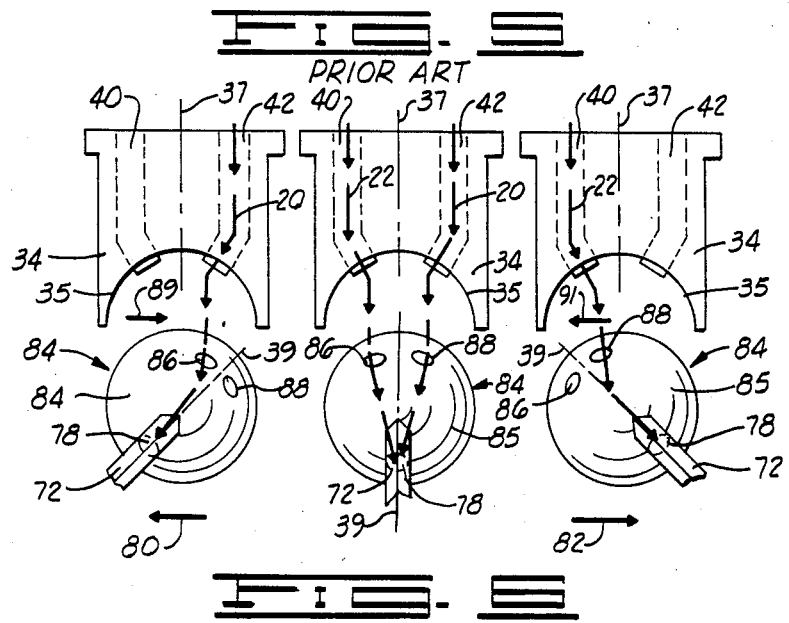
FIG. 6 illustrates another embodiment of the subject ball assembly adapted for crossing hot and cold water channels in the faucet housing shown in FIG. 5.

In FIG. 6, an alternate embodiment of the hot and cold water mixing ball assembly having general reference numeral 84 is shown having a mixing ball 85 with a hot water port 86 and cold water port 88 disposed equally spaced and at a closer distance to the centerline 39 than ports 74 and 76 when the centerline 39 is aligned with the centerline 37 of the housing 34. In this figure the hot and cold water channels 40 and 42 either inadvertently or intentionally have been crossed. When this occurs, the mixing ball 85 is used to replace the mixing ball 70 shown in FIG. 5. In the center drawing in FIG. 6, the hot and cold water ports 86 and 88 receive a mix of water from the channels 40 and 42. When the handle stem 72 is moved to the left indicated by arrow 80, the hot water port 86 moves to the right indicated by arrow 89. As this occurs, the hot water port 86 moves to the right of the centerline 37 and is indexed with the now hot water channel 42 for receiving hot water therethrough. It should be noted the mixing ball 85 has a return port 78 the same as the return port 78 shown in FIG. 6. When it is desired to receive cold water, the handle stem 72 is moved to the right indicated by arrow 82 and at this time, the cold water port 88 moves to the left of the centerline 37 indicated by arrow 91 and is indexed and communicates with the now cold water channel 40 for receiving cold water therethrough.

From reviewing the above drawings and in particular, FIGS. 4 and 6, it can be seen that through proper port spacing of mixing ball assemblies 60 and 84, the assemblies can be used for installation in crossing hot and cold water lines without replacing the entire mixing valve 12 or replumbing hot and cold water lines 18 and 22 as shown in FIG. 1.

Changes may be made in the construction and arrangement of the parts or elements of the embodiments as described herein without departing from the spirit or scope of the invention defined in the following claims.

What is claimed is:

1. In a mixing valve for receiving hot and cold water through left and right inlet channels respectively when inlet lines to the valve are disposed in a normal condition and for receiving cold and hot water through the left and right channels respectively when the inlet lines are crossed, said valve, regardless of whether the inlet lines are crossed or not, having a single operating handle adjustable clockwise from a mixed water position to a cold water position to discharge cold water through an outlet chanel and adjustable counterclockwise from the mixed water position to a hot water position to discharge hot water through the outlet channel, the improvement comprising:

a flow-through, reversible mixing ball operatively coupled with said operating handle and including first, second, and third spaced-apart primary ports defined thereon for selective communication with said inlet channels when the ball is in a non-reversed orientation, said primary ports being at substantially the same latitude relative to one another with respect to an axis of symmetry through said ball, said second primary port being centered between said first and third primary ports, and first, second, third, and fourth spaced-apart secondary ports defined thereon for selective communication with said inlet channels when the ball is in its reversed orientation, said secondary ports being at substantially the same latitude relative to one another with respect to said axis, said first and fourth secondary ports being positioned outboard of said second and third secondary ports respectively, each of said primary ports being in communication with each of said secondary ports, said first and fourth secondary ports having selectively removable plug means closing the same, said primary ports and said secondary ports being diametrically opposed, at least one of said primary ports being disposed for communication with said outlet channel when the lines are crossed, the ball is reversed and one of said secondary ports is in communication with one of said inlet channels, said second secondary port being disposed for communication with said left inlet channel and said third secondary port being disposed for communication with said right inlet channel when the lines are crossed, the ball is reversed and said handle is in said mixed water position, said first secondary port being disposed for communication with said left inlet channel when the lines are crossed, the ball is reversed, said handle is in said cold water position and said plug means is removed, said fourth secondary port being disposed for communication with said right inlet channel when the lines are crossed, the ball is reversed, said handle is in said hot water position and said plug means is removed.

2. The valve as set forth in claim 1 wherein said ball is hollow.

3. The valve as set forth in claim 1, said plug means including a pair of plugs pressed into said first and fourth secondary ports respectively.

4. The valve as set forth in claim 1 wherein said ball is composed of stainless steel.

5. In a flow-through mixing ball usable in a mixing valve having a hot water inlet channel on the left and a cold water inlet channel on the right or reversible for use in a mixing valve having reversed hot and cold inlet channels in which the cold water inlet channel is on the left and the hot water inlet channel is on the right, said ball being reversible without changing the convention of rotating the ball clockwise from a mixed water position for cold water and counterclockwise from the mixed water position for hot water, the improvement comprising:

a series of first, second and third spaced-apart primary ports on one side of the ball at substantially the same latitude relative to one another with respect to an axis of symmetry through the ball, said second primary port being centered between said first and third primary ports;

a series of first, second, third, and fourth spaced-apart secondary ports on the opposite side of the ball at substantially the same latitude relative to one another with respect to said axis, said first and fourth secondary ports being positioned outboard of said second and third secondary ports; and selectively removable plug means closing said first and fourth secondary ports for preventing the accidental issuance of hot water from the valve in the event the ball is unintentionally reversely installed in a valve in which the hot and cold water inlet channels are not reversed.

6. In a mixing ball as set forth in claim 5, said ball being hollow.

7. In a mixing ball as set forth in claim 5, said plug means including a pair of plugs pressed into said first and fourth secondary ports respectively.

8. In a mixing ball as set forth in claim 5, said ball being composed of stainless steel.

9. In a mixing ball as set forth in claim 5, said primary ports having bores intersecting internally of the ball with bores of said secondary ports.

10. In a mixing valve as claimed in claim 1, said primary ports having bores intersecting internally of the ball with bores of said secondary ports.

* * * * *